United States Patent

Noguchi et al.

[11] Patent Number: 5,639,168
[45] Date of Patent: Jun. 17, 1997

[54] BALL BEARING FOR SUPPORTING A SPINDLE ROTATING AT HIGH SPEED

[75] Inventors: Shingo Noguchi, Tokyo; Kiyoshi Hirakawa, Kanagawa, both of Japan

[73] Assignee: NSK Ltd., Tokyo, Japan

[21] Appl. No.: 712,749

[22] Filed: Sep. 12, 1996

Related U.S. Application Data

[63] Continuation of Ser. No. 288,912, Aug. 11, 1994, abandoned.

[30] Foreign Application Priority Data

Aug. 11, 1993 [JP] Japan ................... 5-217916
Jul. 4, 1994 [JP] Japan ................... 6-152266

[51] Int. Cl.⁶ ........................................ F16C 33/62
[52] U.S. Cl. ...................... 384/492; 384/609; 384/613; 384/912; 384/491
[58] Field of Search ........................ 384/492, 491, 384/609, 615, 613, 625, 912

[56] References Cited

FOREIGN PATENT DOCUMENTS

| | | | |
|---|---|---|---|
| A20294813 | 12/1988 | European Pat. Off. | F16C 33/62 |
| 62-218542 | 9/1987 | Japan | C22C 38/06 |
| 63-308218 | 12/1988 | Japan | F16C 33/62 |
| 64-83625 | 3/1989 | Japan | C21D 9/40 |
| 522846 | 3/1993 | Japan | F16C 33/58 |
| 2224745 | 5/1990 | United Kingdom | C22C 38/00 |
| 2275509 | 8/1994 | United Kingdom | F16C 33/58 |

*Primary Examiner*—Lenard A. Footland
*Attorney, Agent, or Firm*—Sughrue, Mion, Zinn, Macpeak & Seas

[57] ABSTRACT

A ball bearing for supporting a spindle rotating at high speed is provided with at least one member of an inner race and a shaft having an inner raceway in an outer peripheral surface thereof, an outer race having an outer raceway in an inner peripheral surface thereof, and a plurality of balls having 3 mm or less in diameter which are rollingly provided between the inner raceway and the outer raceway, the balls being arranged along a pitch circle 11 mm or less in diameter. A bearing steel or stainless steel which is used to form the member having the raceway is reduced to 6% by volume or less in the amount of retained austenite, so that the raceways are improved in impression resistance. This eliminates the difficulty that the impression of the raceway lowers the acoustic characteristic.

16 Claims, 4 Drawing Sheets

BALL BEARING FOR SUPPORTING A SPINDLE ROTATING AT HIGH SPEED

This is a Continuation of application Ser. No. 08/288,912 filed Aug. 11, 1994, abandoned.

BACKGROUND OF THE INVENTION

The present invention relates to a ball bearing which is built in a hard disk drive device (HDD), a video tape recorder (VTR), a digital audio tape recorder (DAT) or the like, to support the spindle rotating at high speed.

For instance, in a hard disk drive device built in a computer, a spindle motor as shown in FIG. 1 is provided to rotate the hard disk driving shaft 1 at high speed. A pair of ball bearings 3 and 3 are provided between the cylindrical surface of the shaft 1 and the inner surface of the housing 2, so as to rotatably support the shaft 1 inside the housing 2. Each of the ball bearings 3 and 3 provides: an inner race 5 of steel having an inner raceway 4 in the outer peripheral surface; an outer race 7 having an outer raceway 6 in the inner peripheral surface; and a plurality of steel balls 8 which are rollingly provided between the inner raceway 4 and the outer raceway 6. The steel balls 8 are pre-loaded so that they may not be fluctuated during the rotation of the shaft 1.

In addition to the above-described spindle motor shown in FIG. 1, spindle motors as shown in FIGS. 2 and 3 have been employed for hard disk drive devices (HDD). In the spindle motor shown in FIG. 2, an outer race 7a having a plurality of outer raceways 6 and 6 in the inner cylindrical surface is integral with a hub, and inner raceways 4 and 4 are formed in the cylindrical surface of the shaft 1 and in the outer cylindrical surface of an inner race 5, respectively. Further, in another embodiment of the spindle motor shown in FIG. 2, a plurality of inner races 5 having inner raceways 4 in the outer peripheral surfaces may be provided instead of the inner raceway 4 formed in the cylindrical surface of the shaft 1. According to this embodiment, the spindle motor provides the inner raceways 4 formed in the inner races 5 separated from the shaft 1. Moreover, in the spindle motor shown in FIG. 3, a plurality of inner raceways 4 and 4 are formed in the cylindrical surface of the shaft 1, and a plurality of outer raceways 6 and 6 are formed in the outer peripheral surface of the outer race 7b.

In any one of the above-described spindle motors, the members having the inner raceway 4 and the outer raceway 6; that is, the inner race 5 and the outer race 7 in the case of FIG. 1, the outer race 7a and the shaft 1 and the inner race 5 in the case of FIG. 2, and the shaft 1 and the outer race 7b in the case of FIG. 3 are heretofore made by using high carbon chromium bearing steel class 2, SUJ2 (JIS G 4805). The bearing steel is subjected to so-called "standard heat treatment". That is, after being hardened at temperatures ranged from 820° C. to 860° C., it is tempered at temperatures of from 160° C. to 200° C. In the members thus formed, the raceways are ranged from HRC 58 to HRC 64 in Rockwell hardness, and from 8 to 14% by volume in the amount of retained austenite ($\gamma_R$).

In the case of a ball bearing used in a part which must be high in corrosion-resistance, its raceway is sometime made by using stainless steel. Examples of the stainless steel for such a raceway are SUS440C (JIS G 4303) and 13 Cr martensite stainless steel. The stainless steel is hardened at a temperature of about 1050° C., and is then subjected to subzero treatment, and tempered at temperatures ranged from 150° C. to 200° C. In the ball bearing thus formed, the raceways are ranged from HRC 57 to HRC 62 in hardness, and from 8 to 12% by volume in the amount of retained austenite ($\gamma_R$).

Heretofore, the permanent deformation (or plastic deformation) of the raceway surfaces (the inner and outer raceways 4 and 6) of the bearing rings of a ball bearing of this type is defined in terms of "basic static load rating $C_o$". When, with the basic static load rating $C_o$, the maximum contact surface pressure between the raceway surfaces and the rolling surfaces of the balls 8 exceeds 4000 MPa, the raceway surfaces are adversely affected; that is, they are permanently deformed.

On the other hand, a high precision small ball bearing used in a hard disk drive device (HDD) or a video tape recorder (VTR); that is, a ball bearing which is of at least JIS class 5 in dimensional accuracy or rotational accuracy and of low torque, must be considerably high in sound and noise characteristics. In the high precision small ball bearing, extremely small permanent deformation occurs with the raceway surfaces when a load or impact load is applied thereto which is much smaller than the load (the maximum contact surface pressure of 4000 MPa) specified according to the aforementioned basic static load rating $C_o$. The permanent deformation deteriorates the acoustic characteristic (increasing noise).

Employed as the high precision small ball bearing as described above is a ball bearing 3 in which, in general, the diameter $D_w$ (FIG. 1) of the balls 8 set between the inner race and the outer race is 3 mm or less, and the pitch circle diameter $D_{pw}$ (FIG. 1) along which the balls are arranged is 11 mm or less. On the other hand, recently hard disk drive devices (HDD) or video tape recorders (VTR) have been miniaturized, and accordingly the ball bearings used therein have been also miniaturized. Hence, the above-described deterioration in acoustic characteristic caused by the small impact load cannot be neglected.

SUMMARY OF THE INVENTION

In view of the foregoing, an object of the present invention is to provide a ball bearing in which the bearing rings are improved in load resistance and in impact resistance (impression resistance) so that the raceway surfaces are substantially free from harmful permanent deformation.

The foregoing object of the present invention has been achieved by the provision of a ball bearing providing: at least one member of an inner race and a shaft having an inner raceway in the outer peripheral surface thereof; an outer race having an outer raceway in the inner peripheral surface thereof; and a plurality of balls having 3 mm or less in diameter which are rollingly provided between the inner raceway and the outer raceway, the balls being arranged along a pitch circle 11 mm or less in diameter, in which, according to the present invention, a steel forming at least one of the inner raceway and outer raceway is 6% by volume or less in the amount of retained austenite.

In the case of the ball bearing of the present invention designed as described above, the difficulty is scarcely raised that the raceways are permanently deformed by the above-described load or impact load. This will be described in more detail. Austenite is smaller in yield stress than martensite. Therefore, in the case of a conventional ball bearing in which the amount of retained austenite is relatively large, 8 to 14% by volume, the raceways are permanently deformed even by a small load or the like. On the other hand, in the ball bearing of the invention in which the amount of retained austenite is relatively small, not more than 6% by volume.

Hence, in the ball bearing of the present invention, the raceway surfaces are high in impression resistance (the yield stress being increased), and therefore they are scarcely permanently deformed by such a small load.

In the ball bearing of the present invention, as described above, the amount of retained austenite is reduced, so that the raceways are improved in impression resistance. In addition, the reduction of the amount of retained austenite prevents the surface accuracy from being deteriorated with time. That is, if the amount of retained austenite in the raceway is large, then the retained austenite is decomposed by the rolling stress applied repeatedly to the raceway. As the retained austenite is decomposed in this manner, the raceway is deteriorated in surface accuracy. On the other hand, in the ball bearing of the present invention, the amount of retained austenite is small. Hence, the deterioration in acoustic characteristic due to the decomposition of the retained austenite is less, and the deterioration in acoustic characteristic due to the deterioration in surface accuracy is also less. Especially where the amount of retained austenite is reduced to 2% by volume or less, the deterioration in acoustic characteristic due to the decomposition of the retained austenite is substantially eliminated.

The amount of retained austenite can be decreased by changing the tempering process, for instance, by increasing the tempering temperature, or by repeatedly tempering the material. By changing the tempering process in the above-described manner, the deterioration in acoustic characteristic due to the decomposition of the retained austenite can be prevented, and the base material's martensite can be improved in stability. Hence, the deterioration in surface accuracy due to the change of the martensite with time can be prevented. Thus, in this case, the deterioration in acoustic characteristic can be decreased more than in the case where the material is subjected to subzero treatment and ordinary tempering.

DETAILED DESCRIPTION OF THE PREFERRED EMBODIMENTS

Figure 1:
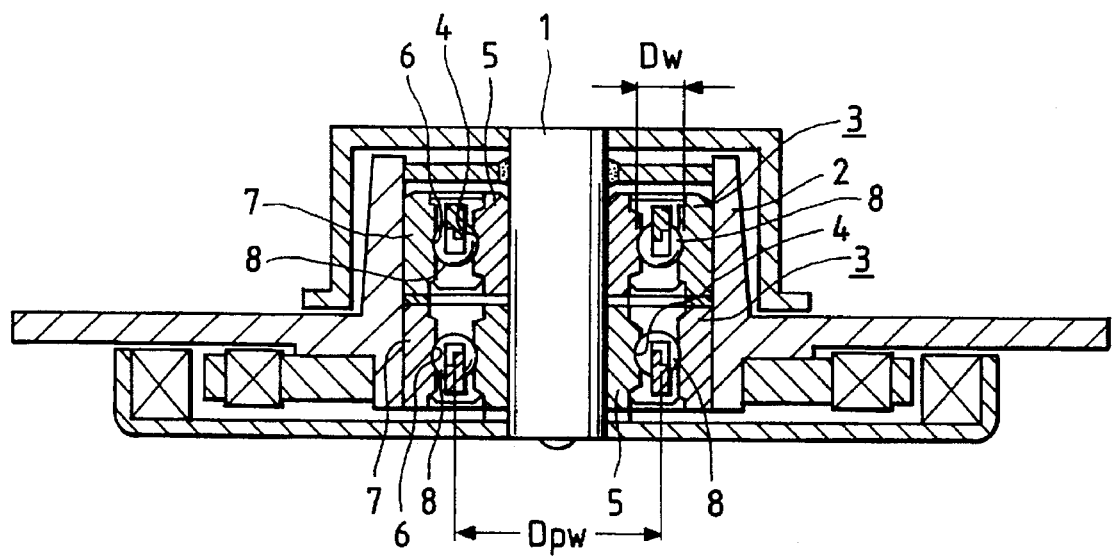
FIG. 1 is a sectional view of a first embodiment of a spindle motor for a hard disk drive device (HDD) in which ball bearings are built, to which the technical concept of the invention is applied.
Figure 2:
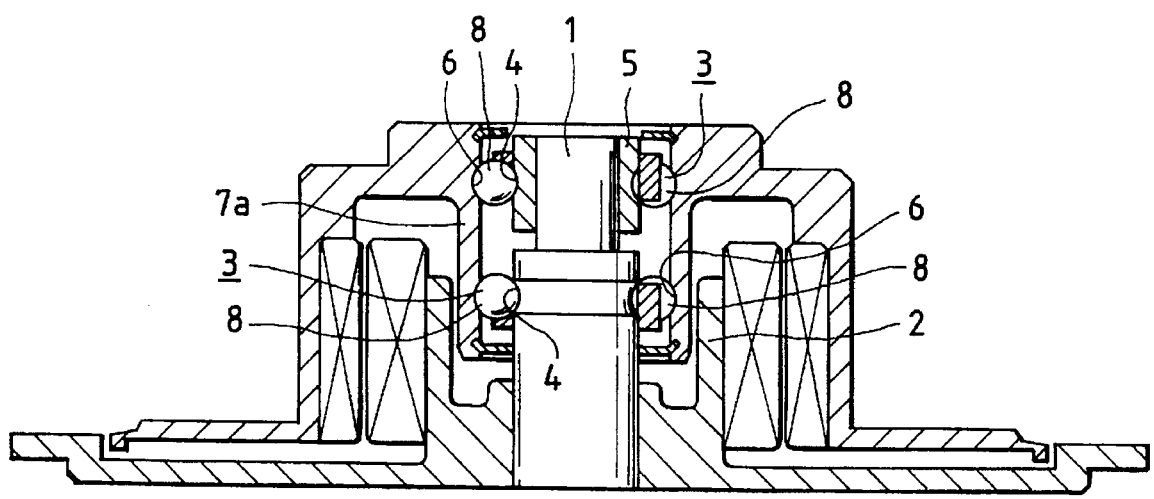
FIG. 2 is a sectional view of a second embodiment of the spindle motor.
Figure 3:
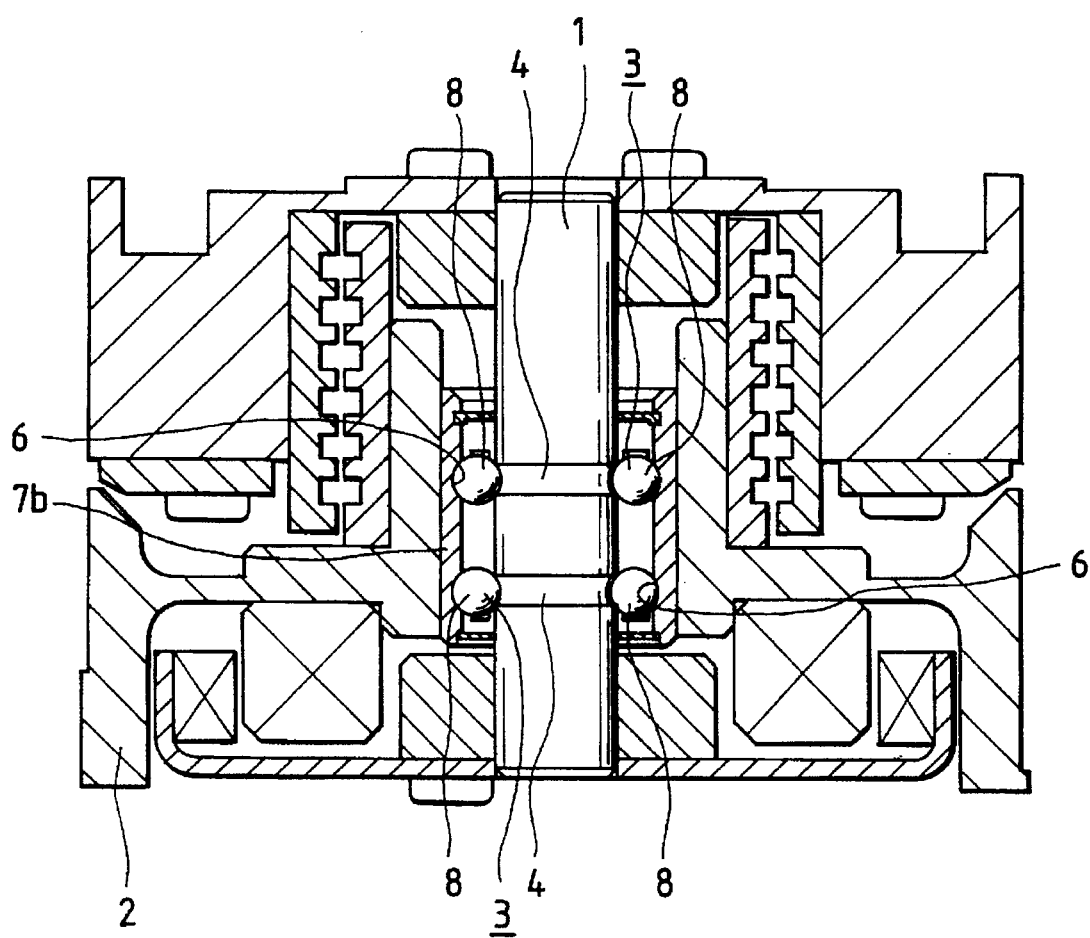
FIG. 3 is a sectional view of a third embodiment of the spindle motor.

In order to confirm the effects of the present invention, experiments or tests performed by the inventor will be described.

First Experiment

A first experiment was carried out with ten (10) different specimens of a ball bearing. In the specimens, the bearing rings, as listed in the following Table 1, were made of SUJ2 or SUS440C and were different in the amount of retained austenite or in heat treatment. In each of the specimens, the amount of retained austenite of the bearing rings was adjusted by changing the heat treatment applied thereto. In the case of the specimen for which no hardening temperature is listed in the Table 1, the bearing rings were hardened at temperatures ranged from 820° C. to 860° C., which are in the range of hardening temperatures in the standard heat treatment.

A first example of a conventional ball bearing (hereinafter referred to as "a comparative example 1", when applicable) was formed in which the bearings rings were made of SUJ 2 and were 10% by volume in the amount of retained austenite. Similarly, a second example of the conventional ball bearing (hereinafter referred to as "a comparative example 2", when applicable) was formed in which the bearing rings were made of SUJ2 and was 8% by volume in the amount of retained austenite. The bearing rings of the comparative examples 1 and 2 were subjected to the aforementioned standard heat treatment which is normally given to ball bearing, and they were HRC 62.5 and HRC 63 in surface hardness, respectively.

A third example of the conventional ball bearing (hereinafter referred to as "a comparative example 3", when applicable) was formed in which the bearing rings were made of SUS440C and 8% by volume in the amount of retained austenite. The bearing rings were hardened at a temperature of 1050° C., and then subjected to subzero treatment at −80° C., and thereafter tempered at 160° C. The bearing rings thus processed were HRC 61 in surface hardness.

A first example of a ball bearing according to the present invention (hereinafter referred to as "a concrete example 1", when applicable) was formed in which the bearing rings were made of SUJ2 and were 6% by volume in the amount of retained austenite. The bearing rings were subjected to the above-described standard heat treatment including subzero treatment at −20° C. before the tempering of the standard heat treatment. The bearing rings thus processed were HRC 63.5 in surface hardness.

A second example of the ball bearing according to the present invention (hereinafter referred to as "a concrete example 2", when applicable) was formed in which the bearing rings were made of SUJ2 and were 4% by volume in the amount of retained austenite. The bearing rings were hardened, and then tempered at 220° C. The bearing rings thus processed were HRC 61 in surface hardness.

A third example of the ball bearing according to the present invention (hereinafter referred to as "a concrete example 3", when applicable) was formed in which the bearing rings were made of SUJ2 and were 4% by volume in the amount of retained austenite. The bearing rings were subjected to the above-described standard heat treatment including subzero treatment at −196° C. before the tempering of the standard heat treatment. The bearing rings thus processed were HRC 64.5 in surface hardness.

A fourth example of the ball bearing according to the present invention (hereinafter referred to as "a concrete example 4", when applicable) was formed in which the bearing rings were made of SUJ2 and were 0% by volume in the amount of retained austenite . The bearing rings were hardened, and then tempered at 240° C. The resultant bearing rings were HRC 59.5 in surface hardness.

A fifth example of the ball bearing according to the present invention (hereinafter referred to as "a concrete example 5", when applicable) was formed in which the bearing rings were made of SUJ2 and were 0% by volume in the amount of retained austenite. The bearing rings were hardened, subjected to a subzero treatment at −80° C., and then tempered at 240° C. The bearing rings thus processed were HRC 61 in surface hardness.

A sixth example of the ball bearing according to the present invention (hereinafter referred to as "a concrete example 6", when applicable) was formed in which the bearing rings were made of SUS440C and were 0% by volume in the amount of retained austenite. The bearing rings were hardened at 1050° C., and then subjected to a subzero treatment at −80° C., and thereafter tempered at 520° C. The bearing rings thus processed were HRC 54 in surface hardness.

A seventh example of the ball bearing according to the present invention (hereinafter referred to as "a concrete example 7", when applicable) was formed in which the bearing rings were made of SUJ2 and were 2% by volume in the amount of retained austenite. The bearing rings were were hardened, then twice tempered at 220° C. The bearing rings thus processed were HRC 60.5 in surface hardness.

TABLE 1

| | Specimen | Retained austenite ($\gamma_R$) | Heat treatment | Hardness (HRC) |
|---|---|---|---|---|
| a | Comparative example 1 (SUJ2) | 10% | Standard heat treatment (standard hardening and tempering) | 62.5 |
| b | Comparative example 2 (SUJ2) | 8% | Standard heat treatment (standard hardening and tempering) | 63 |
| c | Comparative example 3 (SUS440C) | 8% | Hardening at 1050° C., subzero treatment at −80° C., and tempering at 160° C. | 61 |
| d | Concrete example 1 (SUJ2) | 6% | Standard heat treatment, and subzero treatment (−20° C.) | 63.5 |
| e | Concrete example 2 (SUJ2) | 4% | Hardening, and then tempering at 220° C. | 61 |
| f | Concrete example 3 (SUJ2) | 4% | Standard heat treatment, and subzero treatment (−196° C.) | 64.5 |
| g | Concrete example 4 (SUJ2) | 0% | Hardening, and then tempering at 240° C. | 59.5 |
| h | Concrete example 5 (SUJ2) | 0% | Hardening, subzero treatment at −80° C., and tempering at 240° C. | 61 |
| i | Concrete example 6 (SUS440C) | 0% | Hardening at 1050° C., subzero treatment at −80° C., and tempering at 520° C. | 54 |
| j | Concrete example 7 (SUJ2) | 2% | Hardening, and twice tempering at 220° C. | 60.5 |

The ball bearings, the bearing rings of which were made of SUJ 2 or SUS440C and were different in the amount of retained austenite and in heat treatment, were built in a spindle motor as shown in FIG. 1 with the balls 8 preloaded. An impact load was applied to the ball bearings by dropping the spindle motor. More specifically, six different impact loads of 10 kgf, 12 kgf, 15 kgf, 20 kgf, 22 kgf and 25 kgf were applied thereto. The degrees of deterioration (increase in noise) in the acoustic characteristic of the spindle motor were measured before and after the application of each of the impact loads. The results of measurement are as indicated in FIG. 4.

Figure 4:
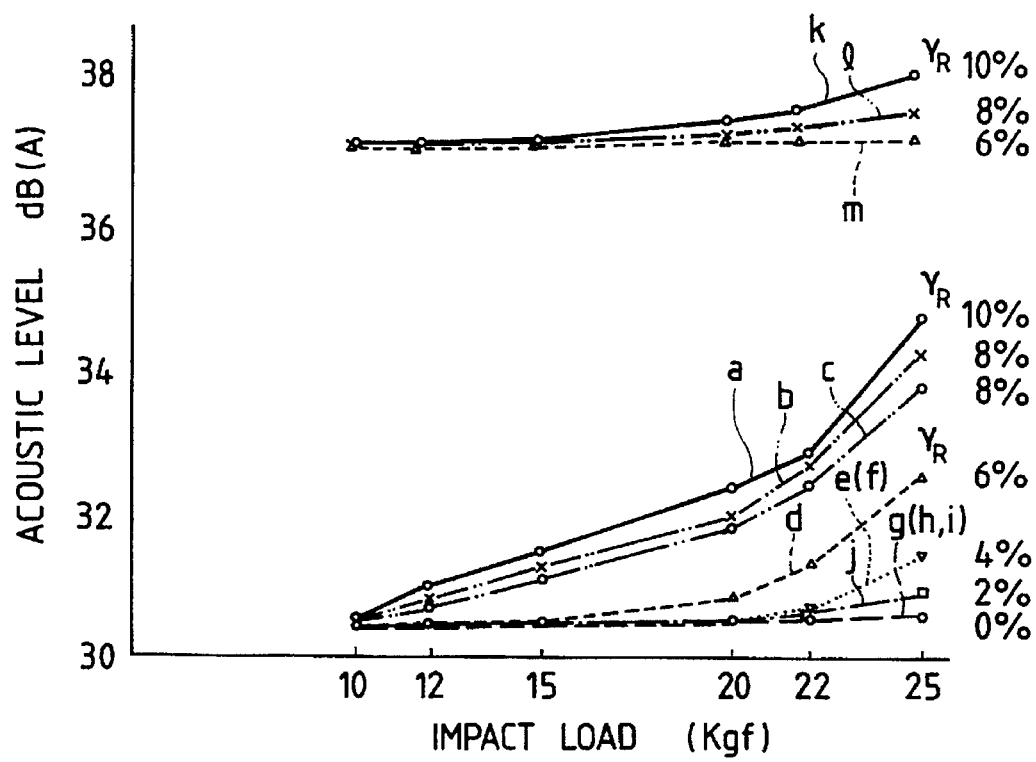
FIG. 4 is a graphical representation indicating impact loads and degrees of deterioration in acoustic characteristic with respect to amounts of retained austenite.

In FIG. 4, the curves a through i indicate the relationships between the amounts of retained austenite of high precision ball bearings and the degrees of deterioration in acoustic characteristic in the cases of high precision ball bearings (JIS class P5). Among those curves, the curve a of solid line indicates the relationships between the impact loads and the degrees of deterioration in acoustic characteristic in the case of a ball bearing whose bearing rings are made of SUJ2 and are 10% by volume in the amount of retained austenite (corresponding to the comparative example 1). The curve b of two-dot chain line indicates the relationships between the impact loads and the degrees of deterioration in acoustic characteristic in the case of a ball bearing whose bearing rings are made of SUJ2 and are 8% by volume in the amount of retained austenite (corresponding to the comparative example 2). The curve c of two-dot chain line indicates the relationships between the impact loads and the degrees of deterioration in acoustic characteristic in the case of a ball bearing the bearing rings of which are of SUS440C and are hardened, subzero-treated, and tempered so that they are 8% by volume in the amount of retained austenite (corresponding to the comparative example 3). The curve d of broken line indicates the relationships between the impact loads and the degrees of deterioration in acoustic characteristic in the case of a ball bearing the bearing rings of which are 6% by volume in the amount of retained austenite (corresponding to the concrete example 1). The curve e of broken line indicates the relationships between the impact loads and the degrees of deterioration in acoustic characteristic in the case of a ball bearing the bearing rings of which are tempered at 220° C. so as to be 4% by volume in the amount of retained austenite (corresponding to the concrete example 2). The curve i of one-dot chain line indicates the relationships between the impact loads and the degrees of deterioration in acoustic characteristic in the case of a ball bearing whose bearing rings are twice tempered at 220° C. so as to be 2% by volume in the amount of retained austenite (corresponding to the comparative example 7). The curve a indicates the relationships between the impact loads and the degrees of deterioration in acoustic characteristic in the case of a ball bearing the bearing rings of which are tempered at 240° C. so as to be 0% by volume in the amount of retained austenite (corresponding to the comparative example 4). Both in the case of a ball bearing in which the bearing rings of SUJ2 are hardened, subzero-treated, and tempered so as to be 0% in the amount of retained austenite (corresponding to the concrete example 5), and in the case of a ball bearing in which the bearing rings of SUS440C are hardened, subzero-treated, and tempered so as to be 0% in the amount of retained austenite (corresponding to the concrete example 6), the degrees of deterioration in acoustic characteristic are substantially equal to those in the case of the concrete example 4. Thus, the relationships between the impact loads and the degrees of deterioration in acoustic characteristic in the cases of the above-described concrete examples 5 and 6 are substantially represented by the curve a; that is, the curve a corresponds to the curves h and i for the concrete examples 5 and 6. Similarly, the curve e corresponds to the curve f of the concrete example 3.

Further in FIG. 4, the curves k, l and m indicate the relationships between the amounts of retained austenite of high precision ball bearings and the degrees of deterioration in acoustic characteristic in the cases of regular ball bearings (JIS Class P0). Among those curves, the curve k indicates the relationships between the impact loads and the degrees of deterioration in acoustic characteristic in the case of a ball bearing whose bearing rings are formed under the same conditions as those in the case of the above-described comparative example 1. The curve 1 indicates the relationships between the impact loads and the degrees of deterioration in acoustic characteristic in the case of a ball bearing the bearing rings of which are formed under the same conditions as those in the case of the above-described comparative example 3. The curve m indicates the relationships between the impact loads and the degrees of deterioration in acoustic characteristic in the case of a ball bearing the bearing rings of which are formed under the same conditions as those in the above-described concrete example 1.

As is apparent from FIG. 4, when a high precision ball bearing according to JIS Class 5 or higher being considerably high in acoustic characteristic is so designed that the bearing rings are not more than 6% by volume in the amount of retained austenite, then the resultant ball bearing is less in the degree of deterioration in acoustic characteristic than the comparative example in which the bearing rings are not less than 8% by volume in the amount of retained austenite. This follows the fact that the ball bearing of the present invention is high in load resistance, and in impact resistance, and is substantially free from harmful permanent deformation. With the ball bearing of the present invention, being substantially free from harmful permanent deformation as described above, the degree of deterioration in acoustic characteristic is less. On the other hand, with the conventional regular ball bearing, the acoustic deterioration is not so significant, because its initial acoustic level is high.

Furthermore, with the ball bearing according to the present invention, the deterioration in acoustic characteristic is suppressed which is due to the deterioration in the surface configuration of the bearing rings with time. That is, the surface accuracy of the bearing rings is deteriorated with time by the repetitive application of rolling stress thereto, and the acoustic characteristic is lowered with the deterioration of the surface configuration with time. The deterioration of the surface configuration with time attributes greatly to the decomposition of the retained austenite in the surface layer of the rolling surface. In the ball bearing according to the present invention, the amount of retained austenite, which may deteriorate the surface accuracy with time, is set to not more than 6% by volume, so that the deterioration of the surface configuration with time is suppressed, and accordingly the deterioration in acoustic characteristic is minimized which is due to the deterioration in surface configuration with time. Furthermore, in the ball bearing of the present invention, the bearing rings are suitably tempered that the amount of retained austenite is decreased, and at the same time the martensite is improved in stabilization, with the result that the deterioration in surface configuration with time is more effectively suppressed. Hence, in the ball bearing of the present invention, the deterioration in acoustic characteristic due to the deterioration in surface configuration can be more effectively suppressed than in a ball bearing in which the bearing rings are subjected to subzero treatment and to ordinary tempering. With respect to those features, a second experiment was carried out as follows:

Second Experiment

Figure 5:
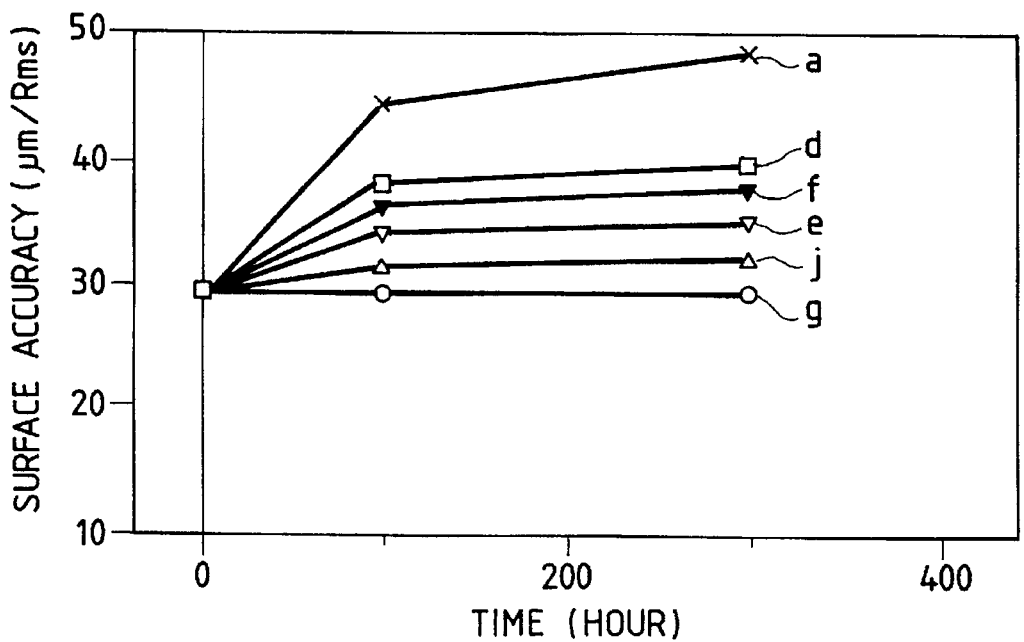
FIG. 5 is also a graphical representation indicating the change in surface accuracy of bearing rings with time.
Figure 6A:
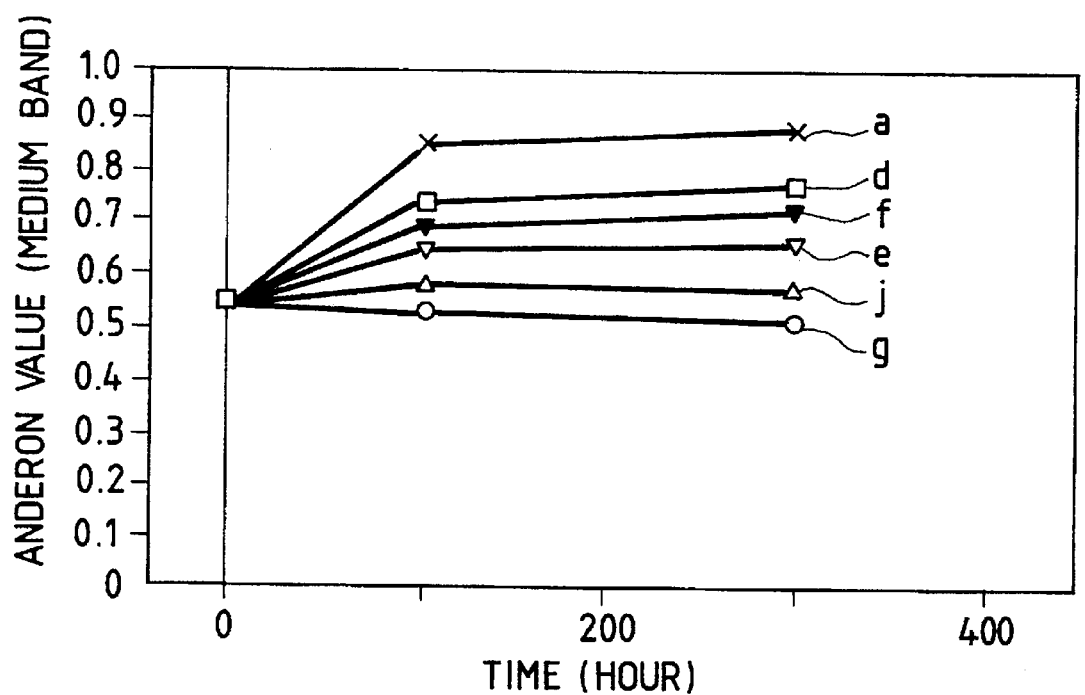
FIG. 6(A) is a graphical representation indicating the change in anderon value (medium band) with time.

The second experiment was carried out as follows: The comparative example 1, and the concrete examples 1, 2, 3, 4, and 7, which are listed in the above-described Table 1, were built in the spindle motors as shown in FIG. 1. Under this condition, the surface accuracies and "anderon" values of the bearing rings were measured. The term "surface accuracy" as used herein is intended to mean the unevenness (wariness) of a raceway surface, which is the integration of steps making the surface uneven measured in $\mu mR_{ms}$. The configuration accuracy is in a high band representing the degrees of relatively fine unevenness, or a low band representing the degrees of relatively coarse unevenness. The high band affects the acoustic characteristic. The measurements in the high band are as indicated in FIG. 5. On the other hand, it is well known that "anderon" values affects the acoustic characteristic. The "anderon" values are in a "low band", "medium band" and "high band" depending on the frequency. FIG. 6(A) indicates the "anderon" values in the medium band, and FIG. 6 (B) indicates the "anderon" values in the high band. In each of FIGS. 5, 6(A) and 6(B), the solid line a represents the comparative example 1, the solid line d the concrete example 1, the solid line e the concrete example 2, the solid line f the concrete example 3, the solid line a the concrete example 4, and the solid line i the concrete example 7.

Figure 6B:
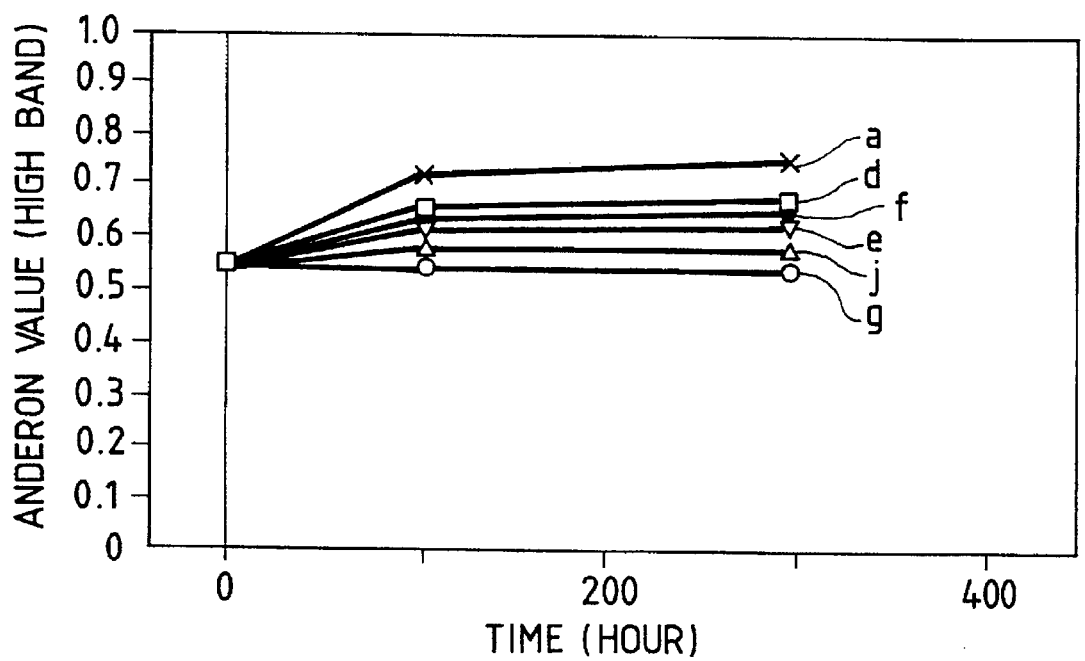
FIG. 6(B) is a graphical representation indicating the change in anderon value (high band) with time.

As is seen from FIGS. 5, 6(A) and 6(B), the bearing rings of the ball bearing according to the present invention are advantageous in the following points: That is, the degree of deterioration of the surface accuracy with time is less. Especially where the bearing rings are 2% by volume or less in the amount of retained austenite, the surface accuracy is scarcely deteriorated with time. Hence, the ball bearing of the present invention is substantially free from the difficulty that the acoustic characteristic is lowered with the deterioration of the surface configuration with time. This is due to the fact that the amount of retained austenite in the surface layer of the rolling surface is less, and therefore the surface nature is less deteriorated by the decomposition of the retained austenite therein.

The ball bearing of the present invention is designed as described above, Therefore, a hard disk drive device (HDD), video tape recorder (VTR), or the like with the ball bearing or bearings of the present invention is improved in acoustic characteristic, and accordingly in operating performance.

What is claimed is:

1. A ball bearing comprising:

at least one member of an inner race and a shaft having an inner raceway in an outer peripheral surface of the member;

an outer race having an outer raceway in an inner peripheral surface of the outer race; and a plurality of balls having a diameter of 3 mm or less which are rollingly provided between said inner raceway and said outer raceway, said balls being arranged along a pitch circle that is 11 mm or less in diameter, wherein a steel forming at least one of said inner raceway and outer raceway is 2% by volume or less in the amount of retained austenite, the ball bearing being capable of maintaining operation noise produced during operation to a required acoustic level.

2. The ball bearing of claim 1, wherein said steel comprises high carbon chromium bearing steel SUJ2.

3. The ball bearing of claim 2, wherein said steel is hardened at a temperature in a range from 820° C. to 860° C., subjected to subzero treatment at −20° C., and then tempered at a temperature in a range from 160° C. to 200° C.

4. The ball bearing of claim 2, wherein said steel is hardened at a temperature in a range from 820° C. to 860° C., and then tempered at 220° C.

5. The ball bearing of claim 2, wherein said steel is hardened at a temperature in a range from 820° C. to 860°

C., subjected to subzero treatment at −196° C., and then tempered at a temperature in a range from 160° C. to 200° C.

6. The ball bearing of claim 2, wherein said steel is hardened at a temperature in a range from 820° C. to 860° C., and then tempered at 240° C.

7. The ball bearing of claim 2, wherein said steel is hardened at a temperature in a range from 820° C. to 860° C., subjected to a subzero treatment at −80° C., and then tempered at 240° C.

8. The ball bearing of claim 2, wherein said steel is hardened at a temperature in a range from 820° C. to 860° C., and then twice tempered at 220° C.

9. The ball bearing of claim 1, wherein said steel comprises a material selected from stainless steel SUS440C and 13 Cr martensite stainless steel.

10. The ball bearing of claim 9, wherein said steel is hardened at 1050° C., subjected to a subzero treatment at −80° C., and then tempered at 520° C.

11. The ball bearing of claim 1, wherein the ball bearing is built in a hard disk drive device.

12. The ball bearing of claim 1, wherein the ball bearing is built in a video tape recorder.

13. The ball bearing of claim 1, wherein the ball bearing is built in a digital audio tape recorder.

14. The ball bearing of claim 1, wherein the amount of retained austenite in the steel is substantially 0% by volume.

15. The ball bearing of claim 1, wherein after the steel is subjected to hardening and tempering, at least one of the inner raceway and the outer raceway has a hardness of $H_RC$ 54 or more.

16. The ball bearing of claim 1, wherein after the steel is subjected to hardening and tempering, a subzero treatment and tempering, at least one of the inner raceway and the outer raceway has a hardness of $H_RC$ 54 or more.

* * * * *